United States Patent [19]

Shaw

[11] Patent Number: 5,702,078
[45] Date of Patent: Dec. 30, 1997

[54] HAND STABILIZING IDENTIFICATION MEMBER FOR AN INSTRUMENT PANEL

[75] Inventor: Jeffery H. Shaw, Seattle, Wash.

[73] Assignee: PACCAR Inc., Bellevue, Wash.

[21] Appl. No.: 448,739

[22] Filed: May 24, 1995

[51] Int. Cl.$^6$ .............................. B62D 25/14; F21V 33/00
[52] U.S. Cl. ........................... 248/118; 248/27.1; 296/70; 362/85; D12/192
[58] Field of Search ..................... 248/27.1, 118; D12/192; 362/76, 77, 85, 61; 40/579, 593; 180/90; 296/70; 455/154.1, 158.1

[56] References Cited

U.S. PATENT DOCUMENTS

| | | | |
|---|---|---|---|
| D. 265,476 | 7/1982 | Zizza | D13/12 |
| 2,072,655 | 3/1937 | Tjaarda | 180/90 |
| 2,609,475 | 9/1952 | Sandin et al. | 362/85 |
| 3,435,702 | 4/1969 | Smith | 74/552 |
| 4,131,772 | 12/1978 | Weckenmann et al. | 200/61.54 |
| 4,309,012 | 1/1982 | Fukunaga | 248/27.1 |
| 4,421,190 | 12/1983 | Martinson et al. | 180/90 |
| 4,448,276 | 5/1984 | Nakamoto et al. | 180/90 |
| 4,518,836 | 5/1985 | Wooldridge | 200/61.54 |
| 4,765,701 | 8/1988 | Cheslak | 350/96.1 |
| 4,881,295 | 11/1989 | Odemer | 248/27.1 |
| 5,259,655 | 11/1993 | Anderson | 248/27.1 |

*Primary Examiner*—Michael Safavi
*Attorney, Agent, or Firm*—Seed and Berry LLP

[57] ABSTRACT

A substantially horizontal hand stabilizing member attached to a vehicle instrument panel adjacent to a plurality of switches. The hand stabilizing member protrudes outwardly away from the instrument panel and provides a support surface that is a first distance from the switches. The hand stabilizing member allows an operator to engage and move a movable portion of a selected switch with a first portion of his or her hand when a second portion of the operator's hand engages the support surface and stabilizes the operator's hand from movement relative to the switch. The hand stabilizing member includes indicium on identification markers that are substantially adjacent to respective switches, and the indicium represents a function associated with the respective switch. The hand stabilizing member of the preferred embodiment also includes tactile locating members adjacent to the switches to enable the user to non-visually identify the location of a selected switch. The hand stabilizing member also has a light assembly positioned adjacent to the identification markers to illuminate the indicium to facilitate visual identification of the location of a selected switch.

17 Claims, 3 Drawing Sheets

1

HAND STABILIZING IDENTIFICATION MEMBER FOR AN INSTRUMENT PANEL

TECHNICAL FIELD

The present invention relates to control panels and, more particularly, to instrument panels in vehicles.

BACKGROUND OF THE INVENTION

A vehicle, such as an automobile, a truck, a boat, an airplane, or the like, typically has several components, such as instruments, switches, dials, accessories, and controls mounted on an instrument panel, and these components facilitate operation of the vehicle by an operator. The instrument panel typically supports several switches or the like in an aligned, preselected arrangement that allows the operator to see and access the switch while operating the vehicle.

The vehicle and its operator often experience a rough ride because of the uneven terrain, turbulence, or excessive vibration, and this rough ride makes it difficult for the operator to steady his or her hand relative to, for example, one or more of the switches mounted on the instrument panel. As a result, the operator's hand easily and involuntarily moves relative to the selected switch, thereby making it difficult to activate the switch while operating the vehicle. Further, such an uneven ride requires substantial concentration by the operator, and it is often difficult or impractical for the operator to take his or her eyes off of the road and focus on the series of switches to determine the location of a selected switch which the operator desires to manipulate.

The instrument panels in vehicles typically include rocker switches or toggle switches that are connected to the electrical system of the vehicle and adapted to control different operations or functions of the vehicle. The rocker switch assemblies and toggle switch assemblies are not adapted to support and stabilize the hand of the operator and prevent undesirable movement of the operator's hand relative to the instrument panel during operation of the vehicle. As a result, the operator often stabs or swipes at the toggle switches or tries repeatedly to keep his or her hand on the paddle until it is properly switched to the selected position. The toggle switch assemblies and rocker switch assemblies are not sufficiently strong to withstand being swiped at and hit repeatedly throughout the life of the switch when an operator attempts to flip the switch to a selected position. Accordingly, conventional toggle switches and rocker switches can experience a reduced life as a result of harsh treatment by an operator that occurs when driving in a high vibration environment.

A further drawback to the conventional instrument panels in vehicles is the positioning and alignment of the switches. When a driver is operating in a high vibration environment, as is typically encountered when driving a long-haul truck, it is difficult for the driver to quickly look away from the road and focus on the switches. As a result, often times a driver will continue watching the road while blindly stabbing or groping at the instrument panel in an attempt to find the desired switch. Such blind searching for the appropriate switch can be very frustrating and difficult, particularly when a driver is required to concentrate fully on the road. Therefore, the conventional instrument panels having rows of switches and other controls can be frustrating and difficult to use by the driver during operation of the vehicle without visually focusing on the specific switch to be manipulated at a selected time.

When the operator can and does look at the switches on the instrument panel, visual identification of each of the toggle switches and rocker switches, and other components, is typically facilitated by individual lights behind each of the components. Accordingly, the conventional instrument panel requires a relatively large number of lights to provide sufficient illumination and identification of the switches, controls, and other components. Installation and assembly of the instrument panels with the large number of lights is a time-consuming process, and maintenance of such an instrument panel, including replacement of the individual lights, is a very labor-intensive and time-consuming process.

SUMMARY OF THE INVENTION

The present invention provides a vehicle instrument panel assembly that includes a plurality of components connected to an instrument panel and a hand stabilizing member attached to the instrument panel adjacent to the plurality of components. The hand stabilizing member is positioned to allow a first portion of the operator's hand to engage and manipulate at least one of the plurality of components when a second portion of the operator's hand engages the hand stabilizing member and supports and stabilizes the operator's hand from movement relative to the instrument panel and component. In one embodiment of the invention, the hand stabilizing member is attached to the instrument panel and extends substantially horizontally above the plurality of components. The hand stabilizing member protrudes outwardly away from the instrument panel to provide a hand support surface that is a first distance from the component and enables the user to manipulate the control device with the first portion of his or her hand while a second portion of his or her hand engages the support surface, and substantially stabilizes the operator's hand against movement relative to the control device.

In the one embodiment, the hand stabilizing member includes indicia above the components to facilitate visual identification thereof, and an illuminating device is connected to a hand stabilizing member adjacent to the indicia. Each of the indicium represents the function associated with the respective switch, and the illuminating device is positioned to illuminate all of the indicium. The hand stabilizing member has a plurality of integral windows therein that expose a portion of the illuminating device and an indicium is retained with or over a respective window, such that the indicium is illuminated by light passing through the window, such that the indicium is visible to the user. Tactile locating members are located on the hand stabilizing member to enable the operator to non-visually identify a location of an adjacent switch.

In an alternate embodiment of the invention, the hand stabilizing member includes a shroud that is removably attached to the protruding portion of the hand stabilizing member, and a tactile locating member is attached to the shroud. The shroud is adapted to allow the operator to visually or tactically identify the indicia.

1 showing the hand stabilizing member and a tactile locating member around a window in the hand stabilizing member.

Figure 5:
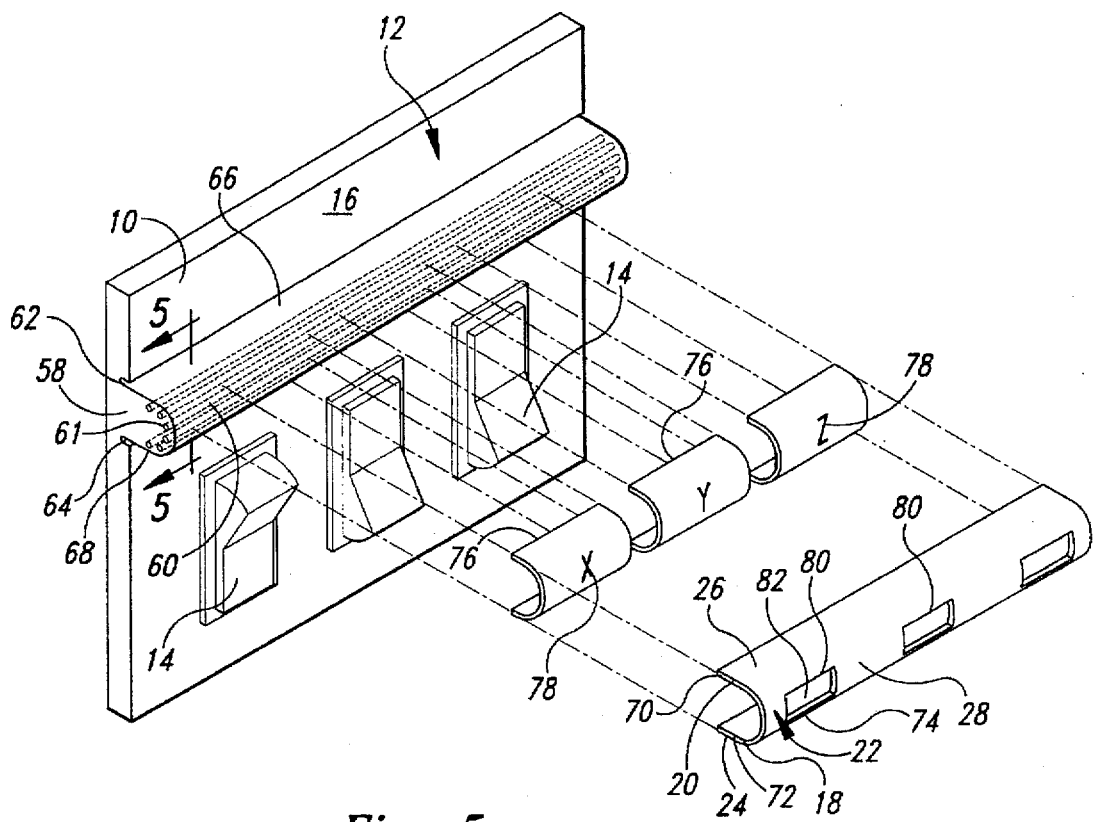

FIG. 5 has an exploded partial isometric view of an alternate embodiment of the present invention with a shroud having windows therein which expose indicia shown on the hand stabilizing member.

Figure 6:
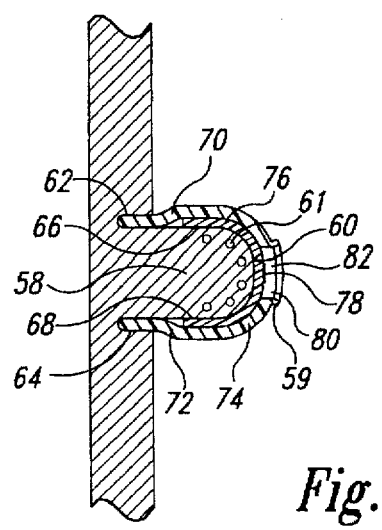

FIG. 6 is an enlarged cross-sectional view taken substantially along line 6—6 of FIG. 5.

DETAILED DESCRIPTION OF THE INVENTION

Figure 1:
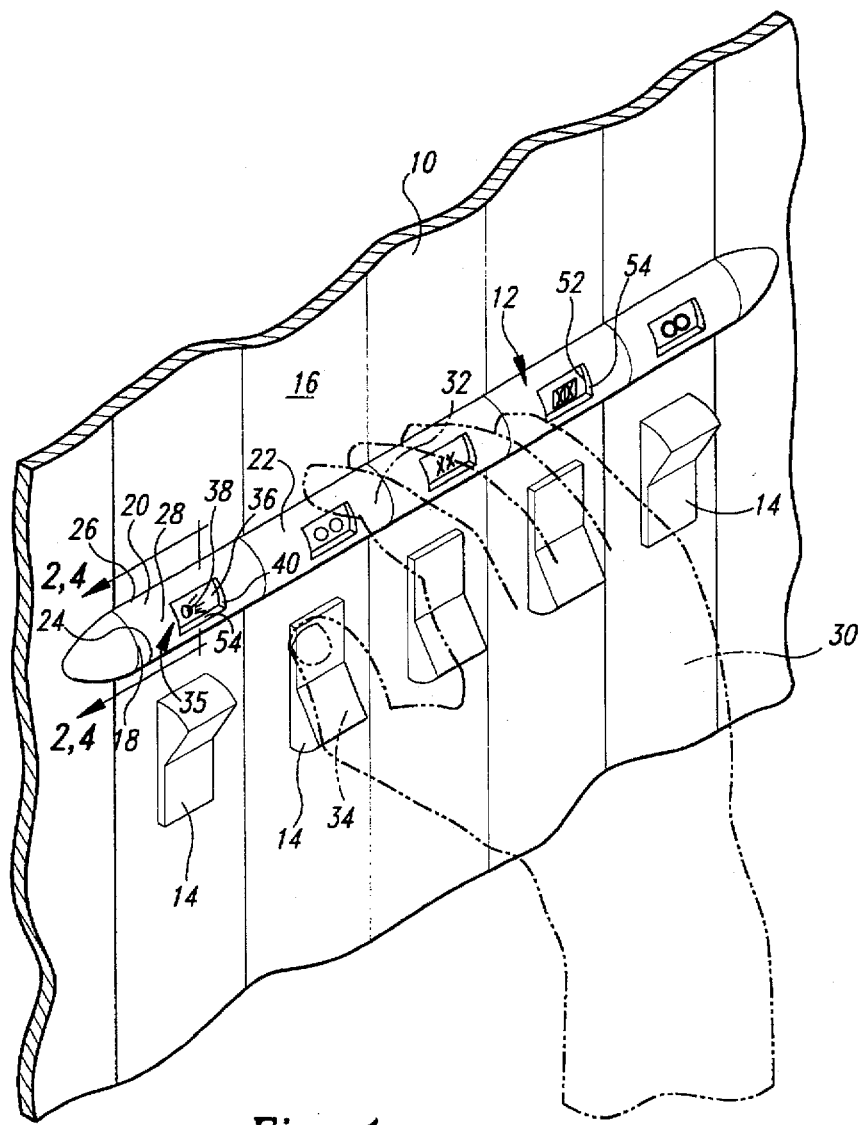
FIG. 1 is an isometric view of a hand stabilizing member in accordance with the present invention attached to a vehicle instrument panel above a plurality of switches.

A vehicle instrument panel 10 is shown in FIG. 1 with a hand stabilizing member 12, in accordance with the present invention, mounted thereon above a plurality of switches 14 aligned in a generally horizontal row. The hand stabilizing member 12 extends substantially horizontally along the instrument panel 10 above the switches 14. Each of the switches 14, such as the rocker switches illustrated in FIG. 1, are electrically connected to the electrical system of the vehicle to control operation of a selected function or component of the vehicle. The hand stabilizing member 12 extends outwardly away from a substantially flat front face 16 of the instrument panel 10, such that the hand stabilizing member forms a protrusion on the instrument panel above the switches 14. Although the preferred embodiment is described as being positioned above the switches 14, the hand stabilizing member 12 can be positioned above other components on the instrument panel that are manipulated by the operator.

The hand stabilizing member 12 is a substantially semi-cylindrical protrusion extending from the instrument panel 10 and the hand stabilizing member has a lower portion 18, an upper portion 20 opposite the lower portion 18, and a front portion 22 extending between the upper and lower portions. The lower portion 18 has a bottom surface 24 that faces downwardly toward the switches 14, and the upper portion 20 has a top support surface 26 that faces upwardly and extends outwardly away from the front face 16 of the instrument panel 10. A forward surface 28 of the hand stabilizing member 12 extends between the top and bottom surfaces 26 and 24, respectively, to form the front portion 22 of the hand stabilizing member.

Accordingly, the hand stabilizing member 12 provides a structure on the instrument panel 10 that enables an operator to stabilize his or her hand 30 to limit movement relative to the switches 14 and the instrument panel, for example, by supporting the fingers 32 of his or her hand on the top support surface 26 while the thumb 34 of the operator's hand engages and manipulates one or more of the switches 14 below the hand stabilizing member. As a result, the operator can stabilize his or her hand 30 in a particular position and easily and accurately manipulate the switches 14, for example, when the vehicle travels over rough or uneven terrain.

The hand stabilizing member 12 of the illustrated embodiment is a molded member that has a plurality of apertures 35 formed into the front portion 22. Identification markers 36 are positioned in the apertures 35 so the operator can visually locate a selected switch 14 by looking at the hand stabilizing member. Each identification marker 36 is positioned above a respective switch 14, and the identification marker includes indicia 38 thereon that represent a function associated with the respective switch. Accordingly, an operator can visually identify the function of the switches 14 by looking at the identification markers 36. The identification markers 36 of the illustrated embodiment are slightly recessed in a recessed area 40 along the front define by the apertures 35 portion 22.

Figure 2:
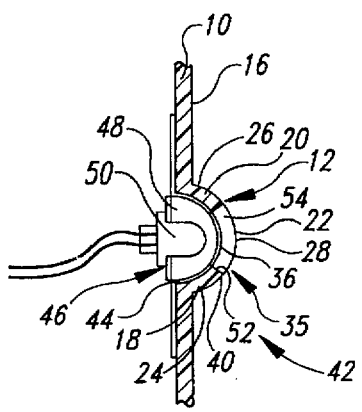
FIG. 2 is an enlarged cross-sectional view taken substantially along line 2—2 of FIG. 1.
Figure 3:
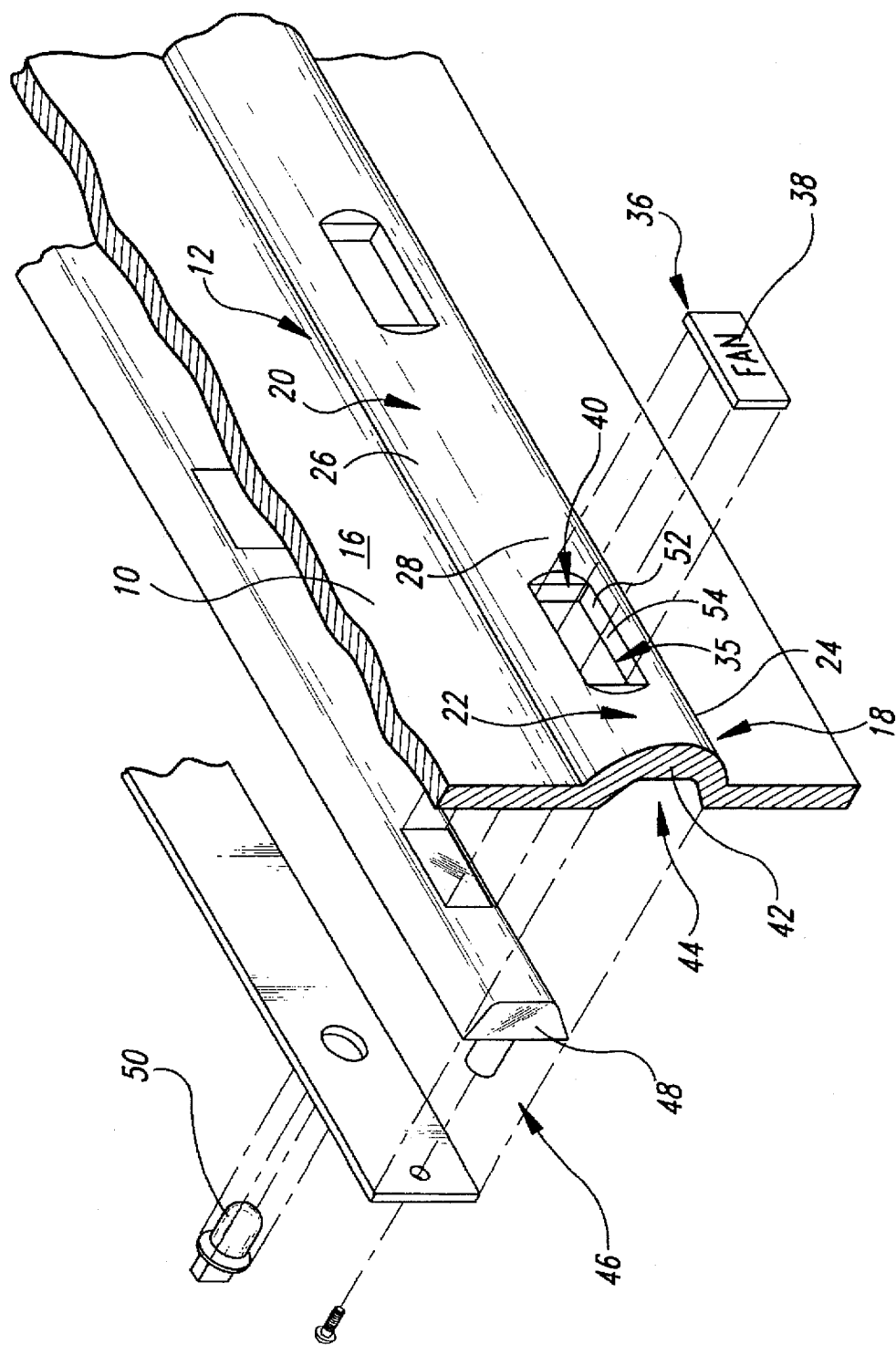
FIG. 3 is an enlarged, exploded partial isometric view of the hand stabilizing bar of FIG. 1.

In the embodiment illustrated in FIGS. 2 and 3, the hand stabilizing member 12 is a molded portion of the instrument panel 10, and the upper portion 20 and lower portion 18 of the hand stabilizing member are integrally connected to the instrument panel 10. The upper and lower portions 20 and 18 and the front portion 22 define a protruding portion 42 that defines a cavity 44 behind the front portion. A light assembly 46 is located in the cavity 44, and the light assembly extends horizontally substantially along the length of the protruding portion 42 behind the front portion 22 and the identification markers 36. The light assembly 46 includes a support structure 48 that is positioned within the cavity 44 and a plurality of light bulbs 50 are carded by the support structure. The support structure 48 is a substantially translucent member such that light from the light bulbs 50 shines through the support structure. A light bulb 50 is retained in a position that corresponds to the location of a respective aperture 35 in the front portion 22 of the hand stabilizing member 12. Accordingly, light emitted from the light bulbs 50 passes through the support structure 48, through the identification markers 36, and through the apertures 35, thereby illuminating the indicia 38.

In the preferred embodiment, the light assembly 46 is molded into the back side of the instrument panel so as to fill the cavity 44 during manufacture. This molding process effectively retains the light assembly 46 in the cavity 44. However, other connecting mechanisms can be used to retain the light assembly 46 in the cavity.

The preferred identification markers 36 are self-adhesive markers that are positioned in the apertures 35 in the front portion 22 of the hand stabilizing member 12. The identification markers 36 are adhered directly to the support structure 48 substantially opposite respective light bulbs 50. The indicia 38 on the identification markers 36 are partially translucent such that light from the respective light bulb 50 is visible through the identification markers. The light bulbs 50 are coupled to the electrical system of the vehicle and adapted to be illuminated, for example, when the cab of the vehicle is dark or when the headlights of the vehicle are on. When the light bulbs 50 are activated, they illuminate the identification markers 36 so as to light up the indicia 38. Accordingly, the light assembly 46 and identification markers 36 allow a driver to visually determine the function of a selected switch 14 (FIG. 1) even when the cab of the vehicle is dark.

In an alternate embodiment, not illustrated, the identification markers 36 are securely connected to the from portion 22 of the hand stabilizing member 22 around the apertures 35 so as to retain the identification markers adjacent to the light assembly 46. In a second alternate embodiment, not shown, the identification markers 36 are permanently or removably adhered to the front face 28 of the hand stabilizing member 12.

As best seen in FIGS. 2 and 3, each of the recessed areas 40 in the front portion 22 of the protruding member 42 has a tactile locating member 52 formed by side walls 54 that extend inwardly toward the respective identification marker 36. Each tactile locating member 52 is positioned above a respective switch 14 (FIG. 1). The tactile locating member 52 enables the operator to keep his or her eyes on the road while non-visually locating a selected switch 14 by feeling the hand stabilizing member 12 and locating the desired tactile locating member. Once the operator has non-visually located the tactile locating member 52, he or she can manipulate the switch 14 therebelow while stabilizing his or her hand on the hand stabilizing member 12.

Figure 4:
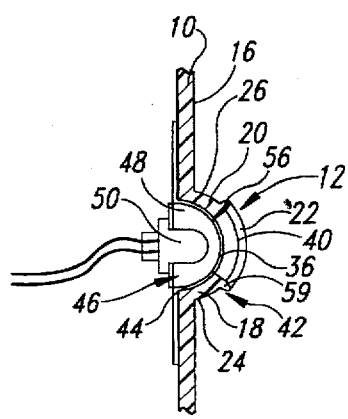
FIG. 4 is an enlarged cross-sectional view of an alternate embodiment taken substantially along the line 4—4 of FIG.

As best seen in FIG. 4, an alternate embodiment of the hand stabilizing member 12 includes raised borders 56 extending outwardly from the protruding member 42 of the hand stabilizing member 12 so as to form a raised tactile locating member 59 around the aperture 35. Each of the raised tactile locating members 59 is positioned directly above and substantially adjacent to a respective switch 14. Accordingly, the raised tactile locating member 59 enables the operator to tactically and non-visually identify the location of the adjacent switch 14.

Although the tactile locating members 52 and 59 discussed above are positioned around the apertures 35, and thus around the identification markers 36 and the indicia 38, other raised or lowered tactile members located adjacent to the switches 14 could be used to provide the operator with non-visual switch-locating means. In addition, different textures on the surface of different portions of the hand stabilizing member can be used to provide tactile indication to the operator, thereby aiding the operator in identifying switch locations.

As best seen in FIG. 5, an alternate embodiment of a hand stabilizing member 12 of the present invention includes a protruding portion 59 that is attached to the instrument panel 10 and extends outwardly away from the front face 16 of the instrument panel. The protruding portion 58 is integrally connected to the instrument panel 10, although the protruding portion could be a separate member permanently or removably attached to the instrument panel. The protruding portion 58 has a plurality of light bars 61 extending horizontally therethrough, and the light bars are adjacent to the protruding portion's front side 60. The light bars 61 are coupled to the vehicle's electrical system and are adapted to be activated, for example, when the vehicle's lights are on or when the vehicle's cab is dark. Although the alternate embodiment is described using light bars 61, other light sources such as light bulbs or lighted strips can be used.

Upper and lower grooves 62 and 64, respectively, in the instrument panel 10 adjacent to the protruding portion 58 removably retain top and bottom legs 70 and 72 of a cover 74 that is shaped to fit over the protruding portion 58. The cover 74 removably retains a plurality of identification markers 76 on the protruding portion 58 above the switches 14. Each of the identification markers 76 is generally a U-shaped unit that is contoured to partially extend over the protruding portion 58 above a selected switch 14. The identification markers 76 are sandwiched between the cover 74 and the protruding portion 58.

Each of the identification markers 76 has indicia 78 thereon that identify to the operator the function of the switch 14 below the respective indicium. The indicium 78 is partially translucent so as to allow light from the light bars 61 to shine through, thereby illuminating the indicium. The remainder of the identification marker 76 is opaque so only the indicia 78 is illuminated when the light bars 61 are illuminated.

The identification markers 76 are positioned side by side along the protruding portion 58 such that edges of adjacent identification markers abut each other. The cover 74 has a plurality of windows 80 formed therein, and each window is positioned adjacent to a respective indicium 78, so the indicium is visible to the operator while operating the vehicle. The cover 74 is constructed of substantially opaque plastic material and the light from the light bars 61 is only visible through the windows 80 and through the indicia 78.

Any light that escapes through the area between abutting identification markers 76 is blocked by the opaque cover 74. Accordingly, the cover 74 provides a shroud over the protruding portion 58 to control illumination of selected portions of the hand stabilizing member 12. Although the preferred cover 74 is opaque, a translucent or transparent cover could be used, with the light between adjacent identification markers 76 being blocked, for example, by overlapping edges of adjacent identification markers.

As best seen in FIG. 6, the top and bottom legs 70 and 72 of the cover 74 are press-fit into the respective upper and lower grooves 62 and 64, such that friction holds the cover in an installed position over the protruding portion 58 and the identification markers 76. The cover 74 could also be retained in 'the installed position by an adhesive or the like that holds the top and bottom legs 70 and 72 in the respective upper and lower grooves 62 and 64. When the cover 74 is in the installed position, the top leg 70 forms the top support surface 26 of the hand stabilizing member 12. Accordingly, the operator supports a first portion of his or her hand on the top leg 78 of the cover 74 while a second portion of his or her hand manipulates the switch 14.

The cover 74 includes raised tactile locating members 59 around the windows 80 that allow the operator to non-visually locate the respective switch 14 as discussed above. In addition, the cover 74 has a transparent shield 82 within the window 80, and the shield is located in front of the indicium 78 so the indicium is visible to the operator through the window and shield. The shield 82 also provides protection for the indicium 78 and the identification markers 76 against damage during operation of the vehicle, particularly in a high vibration environment.

Although particular embodiments have been described in this application for illustrative purposes, the claims are not limited to the embodiments described herein. Equivalent devices may be substituted for those described, which operate according to the principles of the present invention as defined by the following claims.

What is claimed is:

1. A vehicle instrument panel assembly, comprising:
   an instrument panel;
   a plurality of components connected to said instrument panel, one of said components having a control device that is controllable by a first portion of a hand of a user; and
   a hand stabilizing member attached to said instrument panel adjacent to said plurality of components, said hand stabilizing member extending in a first direction away from said instrument panel and extending substantially horizontally in a second direction along a portion of said instrument panel, said hand stabilizing member having a support surface extending in said first direction away from said instrument panel, said support surface being a first distance from said control device that allows a user to engage said control device with said first portion of the user's hand while a second portion of the user's hand engages said support surface and substantially stabilizes the user's hand from movement relative to said control device, said hand stabilizing member including a tactile locating member thereon, said tactile locating member being positioned substantially adjacent to one of said components to non-visually identify to the user a location of said adjacent component.

2. The vehicle instrument panel of claim 1 wherein said hand stabilizing member is positioned above said plurality of components.

3. The vehicle instrument panel of claim 1 wherein said hand stabilizing member is integrally connected to said instrument panel.

4. The vehicle instrument panel of claim 1 wherein said hand stabilizing member includes a protruding portion and a cover member removably attached to said protruding portion.

5. The vehicle instrument panel of claim 4 wherein said cover member has indicium thereon substantially adjacent to one of said plurality of components, said indicium representing a function associated with said selected one of said plurality of components.

6. The vehicle instrument panel of claim 4 wherein said protruding portion of said hand stabilizing member includes indicium located thereon substantially adjacent to one of said plurality of components, said indicium representing a function associated with said one of said plurality of components, and said cover member has a window portion adjacent to said indicium, said indicium being visible to a user through said window portion.

7. The vehicle instrument panel of claim 4 wherein said hand stabilizing member includes indicium located thereon substantially adjacent to one of said plurality of components, said indicium representing a function associated with said one of said plurality of components, and said cover member is transparent, said indicium being visible through said cover member.

8. A vehicle instrument panel assembly, comprising:

an instrument panel;

a plurality of components connected to said instrument panel, one of said components having a control device that is controllable by a first portion of a hand of a user;

a hand stabilizing member attached to said instrument panel adjacent to said plurality of components, said hand stabilizing member extending in first direction away from said instrument panel and extending substantially horizontally in a second direction along a portion of said instrument panel, said hand stabilizing member having a support surface extending in said first direction away from said instrument panel, said support surface being a first distance from said control device that allows a user to engage said control device with said first portion of the user's hand while a second portion of the user's hand engages said support surface and substantially stabilizes the user's hand from movement relative to said control device; and an illuminating device behind said hand stabilizing member, and indicia being coupled to said hand stabilizing member adjacent to said illuminating device, said indicia being positioned to be illuminated by said illuminating device and being positioned substantially adjacent to said plurality of components, said indicia representing functions associated with said plurality of components, said hand stabilizing member having a plurality of integral windows therein positioned with said indicia being visible to a user therethrough.

9. A vehicle instrument panel assembly, comprising:

an instrument panel;

a plurality of components connected to said instrument panel, one of said components having a control device that is controllable by a first portion of a hand of a user; and a hand stabilizing member attached to said instrument panel adjacent to said plurality of components, said hand stabilizing member extending in a first direction away from said instrument panel and extending substantially horizontally in a second direction along a portion of said instrument panel, said hand stabilizing member having a support surface extending in said first direction away from said instrument panel, said support surface being a first distance from said control device that allows a user to engage said control device with said first portion of the user's hand while a second portion of the user's hand engages said support surface and substantially stabilizes the user's hand from movement relative to said control device, said hand stabilizing member including an indicium connected thereto, said indicium being positioned substantially adjacent to one of said plurality of components, said indicium representing a function associated with said selected one of said plurality of components.

10. The vehicle instrument panel of claim 9 further comprising an illuminating device connected to said hand stabilizing member, said illuminating device being adjacent to said indicium and being positioned to illuminate said indicium.

11. The vehicle instrument panel of claim 10 wherein said indicium is attached directly to said illuminating device.

12. A vehicle instrument panel assembly, comprising:

an instrument panel having a plurality of components, one of said components having a control device that is controllable by a first portion of a hand of a user, said instrument panel having a front face that is accessible by a hand of a user; and a hand stabilizing member attached to said vehicle instrument panel adjacent to said plurality of components, said hand stabilizing member extending in a first direction away from said front face of said instrument panel and extending substantially horizontally in a second direction substantially parallel to said front face of said instrument panel, said hand stabilizing member having a support surface extending in said first direction away from said front face of said instrument panel, said support surface being a first distance from said control device which allows a user to engage said control device with said first portion of the user's hand while a second portion of the user's hand engages said support surface and substantially stabilizes the user's hand from movement relative to said control device, said hand stabilizing member including a tactile locating member adjacent to a component, said tactile locating member being positioned to non-visually identify a location of said adjacent control device.

13. The vehicle instrument panel of claim 12 wherein said hand stabilizing member is positioned above said plurality of components.

14. The vehicle instrument panel assembly of claim 12 wherein said hand stabilizing member includes a protruding portion extending outwardly away from said front face of said instrument panel, and a cover member is removably attached to said protruding portion of said hand stabilizing member, said cover member having indicia thereon substantially adjacent to said plurality of components on said instrument panel, said indicia representing functions associated with said components.

15. A vehicle instrument panel assembly, comprising:

an instrument panel having a plurality of components, one of said components having a control device that is controllable by a first portion of a hand of a user, said instrument panel having front face that is accessible by a hand of a user; and a hand stabilizing member attached to said vehicle instrument adjacent to said plurality of component, said hand stabilizing member extending first direction away from said front face of said instrument panel and extending substantially horizontally in a second direction substantially parallel to said front face of said instrument panel, said hand stabilizing member having a support surface extending in said first direction away from said front face of said instrument panel said support surface being distance from said control device which allows a user to engage said control device with said first portion of the user's hand while a second portion of the user's hand engages said support surface and substantially stabilizes the user's hand from movement relative to said control device, said hand stabilizing member including indicium located substantially adjacent to a selected one of said plurality of components on said instrument panel, said indicium representing a function associated with said selected one of said plurality of components.

16. The vehicle instrument panel assembly of claim 15 wherein said hand stabilizing member has a protruding portion extending outwardly from said front face of said instrument panel and a cover member attached to said protruding portion, said cover member having a window portion adjacent to said indicia, said indicia being visible to a user through said window portion.

17. The vehicle instrument panel assembly of claim 15 further comprising an illuminating device connected to said hand stabilizing member, said illuminating device being positioned to illuminate said indicium.

* * * * *